US012631164B2

(12) United States Patent
Benham et al.

(10) Patent No.: US 12,631,164 B2
(45) Date of Patent: May 19, 2026

(54) COMPACT OPPOSED PUMP

(71) Applicants: Cummins Inc., Columbus, IN (US); SCANIA CV AB, Södertälje (SE)

(72) Inventors: Eric A. Benham, Columbus, IN (US); Mustafa Utku Unal, Sodertajlje (SE); Donald J. Benson, Columbus, IN (US); Samuel David Griffith Magnuson, Columbus, IN (US); Benjamin Scott Myser, Batesville, IN (US)

(73) Assignee: Cummins-Scania HPCR System, LLC, Columbus, IN (US)

( * ) Notice: Subject to any disclaimer, the term of this patent is extended or adjusted under 35 U.S.C. 154(b) by 145 days.

(21) Appl. No.: 17/910,570

(22) PCT Filed: Mar. 11, 2020

(86) PCT No.: PCT/US2020/021950
§ 371 (c)(1),
(2) Date: Sep. 9, 2022

(87) PCT Pub. No.: WO2021/183117
PCT Pub. Date: Sep. 16, 2021

(65) Prior Publication Data
US 2023/0235729 A1 Jul. 27, 2023

(51) Int. Cl.
*F04B 1/0421* (2020.01)
*F02M 43/00* (2006.01)
(Continued)

(52) U.S. Cl.
CPC .......... *F04B 1/0421* (2013.01); *F04B 1/0413* (2013.01); *F04B 1/0452* (2013.01);
(Continued)

(58) Field of Classification Search
CPC .................................. F04B 9/04; F04B 53/10
(Continued)

(56) References Cited

U.S. PATENT DOCUMENTS 2,442,488 A 6/1948 Fisk
3,174,436 A * 3/1965 Wanner .................. F04B 1/053 91/493
(Continued)

FOREIGN PATENT DOCUMENTS

CN 102003319 A 4/2011
CN 201851241 U 6/2011
(Continued)

OTHER PUBLICATIONS

International Search Report and Written Opinion for International patent application No. PCT/US2020/021950, filed Mar. 11, 2020, mailed Jun. 20, 2020.
(Continued)

*Primary Examiner* — Charles G Freay
(74) *Attorney, Agent, or Firm* — Taft Stettinius & Hollister LLP

(57) ABSTRACT

The present disclosure provides a high-pressure fuel pump having barrel sets comprising offset, opposing barrel units within the same plane and having plungers disposed therein. The high-pressure fuel pump further includes a camshaft having at least one offset lobe and a cam ring encircling the lobe and in contact with the plungers, which translate the rotational movement of the camshaft to longitudinal movement of the plungers, controlling inflow, compression, and outflow of fuel within the pump.

19 Claims, 6 Drawing Sheets

(51) Int. Cl.

| | |
|---|---|
| ***F02M 43/02*** | (2006.01) |
| ***F04B 1/0413*** | (2020.01) |
| ***F04B 1/0452*** | (2020.01) |
| ***F04B 1/0536*** | (2020.01) |
| ***F04B 7/00*** | (2006.01) |
| ***F04B 9/04*** | (2006.01) |
| ***F04B 53/10*** | (2006.01) |
| ***F04B 53/16*** | (2006.01) |

(52) U.S. Cl.
CPC .......... *F04B 1/0536* (2013.01); *F04B 7/0076* (2013.01); *F04B 9/04* (2013.01); *F04B 53/10* (2013.01); *F02M 43/00* (2013.01); *F02M 43/02* (2013.01)

(58) Field of Classification Search
USPC ................................ 417/298, 505, 569, 570
See application file for complete search history.

(56) References Cited

U.S. PATENT DOCUMENTS 4,426,983 A 1/1984 Seilly
5,701,873 A * 12/1997 Schneider .......... F02M 63/0225 123/462
5,771,864 A 6/1998 Morishita et al.
5,983,863 A 11/1999 Cavanagh
6,289,875 B1 * 9/2001 Shinohara ............ F02M 59/366 123/495
6,347,574 B1 2/2002 Guentert et al.
6,350,107 B1 2/2002 Hamutcu
6,497,216 B2 * 12/2002 Gaessler ................... F01L 1/08 123/90.12
6,558,142 B2 5/2003 De Matthaeis
6,622,706 B2 9/2003 Breeden
6,729,286 B2 5/2004 Onishi et al.
6,764,285 B1 * 7/2004 Kellner ................. F04B 1/0413 92/72
6,889,665 B2 5/2005 Rembold
6,901,844 B2 6/2005 Djordjevic
6,951,165 B2 10/2005 Kuhn et al.
7,048,516 B2 5/2006 Maier et al.
7,080,631 B2 7/2006 Hanyu
7,134,846 B2 11/2006 Djordjevic
7,156,625 B2 1/2007 Grant
7,207,786 B2 4/2007 Grant
7,234,448 B2 6/2007 Hanyu
7,270,047 B2 9/2007 Furuta
7,284,537 B2 10/2007 Kleinbeck et al.
7,444,989 B2 * 11/2008 Shafer ..................... F04B 9/042 123/506
7,524,171 B2 4/2009 Djordjevic et al.
7,681,490 B2 3/2010 Alaze
7,950,905 B2 5/2011 Djordjevic
8,006,673 B2 * 8/2011 Suzuki ................. F02M 59/462 123/506
8,007,251 B2 8/2011 Djordjevic
8,132,558 B2 3/2012 Lucas et al.
8,181,564 B2 * 5/2012 Rosu ..................... F04B 1/0426 92/72
8,256,398 B2 * 9/2012 Akita .................. F02D 41/3845 123/511
8,322,997 B2 12/2012 Auer et al.
8,495,987 B2 7/2013 Lucas et al.
8,579,611 B2 11/2013 Lucas
8,757,047 B2 6/2014 Benson et al.
9,109,558 B2 8/2015 Suzuki
9,291,132 B2 3/2016 Rosu et al.
9,494,121 B2 11/2016 Felton
9,512,811 B2 12/2016 Oki
9,556,836 B2 1/2017 Morel et al.
9,644,585 B2 5/2017 Lucas
9,759,173 B2 9/2017 Hashida et al.
9,759,174 B2 9/2017 Lucas et al.
10,208,725 B2 2/2019 Schmidbauer
10,267,279 B2 4/2019 Sauvetre et al.
10,273,920 B2 4/2019 Lucas
10,288,024 B2 5/2019 Marsden et al.
10,294,905 B2 5/2019 Berhardt
10,294,906 B2 5/2019 Lucas
10,330,065 B2 6/2019 Lucas
10,331,145 B2 6/2019 Duffy
10,422,330 B2 9/2019 Tamura et al.
10,450,992 B2 10/2019 Pellini
10,539,104 B2 1/2020 Pellini
10,851,767 B2 * 12/2020 Aritomi ............... F02M 59/102
11,098,710 B2 8/2021 Pellini et al.
11,459,988 B2 10/2022 Pellini et al.
2002/0189438 A1 12/2002 Furuta
2004/0213689 A1 10/2004 Mori
2005/0047929 A1 3/2005 Hanyu
2005/0100466 A1 5/2005 Aoki et al.
2005/0265867 A1 12/2005 Djordjevic
2006/0216157 A1 9/2006 Breuer et al.
2006/0222517 A1 10/2006 Breuer et al.
2007/0041848 A1 2/2007 Wood et al.
2008/0178845 A1 7/2008 Shimai
2009/0114292 A1 * 5/2009 Shafer .................. F02M 59/466 137/512
2009/0139494 A1 6/2009 Powell
2010/0101539 A1 4/2010 Meier et al.
2012/0180649 A1 * 7/2012 Hishinuma ........... F04B 1/0452 91/435
2012/0294741 A1 11/2012 Nishimura
2015/0211454 A1 7/2015 Tanabe et al.
2017/0009720 A1 1/2017 Schmidbauer
2017/0082094 A1 * 3/2017 Inatani ................. F02M 59/102
2019/0113032 A1 4/2019 Galand et al.
2019/0162141 A1 5/2019 Pellini

FOREIGN PATENT DOCUMENTS

CN 201851247 U 6/2011
CN 201851248 U 6/2011
CN 102465801 A 5/2012
CN 103470416 A 12/2013
CN 104145114 A 11/2014
CN 104234897 A 12/2014
CN 104285061 A 1/2015
CN 109026479 A 12/2018
DE 3419741 A1 11/1985
DE 10236853 A1 2/2004
DE 102009002520 A1 10/2010
EP 0687814 A2 12/1995
EP 1489301 A1 10/2006
EP 2530316 A1 12/2012
WO 2011009699 A1 1/2011
WO 2014202344 A1 12/2014
WO 2019011385 A1 1/2019
WO 2019011386 A1 1/2019
WO 2022031820 A1 2/2022
WO 2023287709 A1 1/2023

OTHER PUBLICATIONS

European Extended Search Report, EP Appln. No. 20924233.8, Jul. 25, 2023, 7 pgs.
Communication Pursuant to Article 94(3) EPC; European Patent Office; European Patent Application No, Counter EP Application No. 20924233.8, Dated May 2, 2025, 7 pgs.
First Office Action issued by the China National Intellectual Property Administration (English Translation Attached), dated Jan. 30, 2026, for related Chinese Application No. 202080098345.9; 21 pg.

* cited by examiner

COMPACT OPPOSED PUMP

CROSS-REFERENCE TO RELATED APPLICATIONS

This application claims priority to International Patent Application No. PCT/US2020/021950, filed Mar. 11, 2020, the disclosure of which is hereby expressly incorporated by reference in its entirety.

TECHNICAL FIELD OF THE PRESENT DISCLOSURE

The present invention generally relates to a compact eccentric opposed pump, and more particularly, to an opposed pump having offset pumping elements to lighten torque load on a camshaft.

BACKGROUND OF THE PRESENT DISCLOSURE

High-pressure fuel pumps are common components of fuel systems for internal combustion engines, especially in diesel engines. High-pressure pumps often receive fuel from a low-pressure system before entering a common rail and ultimately the engine via fuel injectors. The fuel is then compressed and exits the pump. Each of these actions are initiated through movement of a plunger controlled by rotation of a camshaft. For example, in high-pressure pumps, fuel is drawn through a fuel inlet as the plunger is lowered relative to a respective barrel containing the plunger. When the plunger then moves upwards, the fuel is compressed, increasing the pressure of the fuel. The fuel then exits the pump to enter the common rail or another fuel system component.

Typically, fuel pumps are created by drilling bores into a monolithic block to create pumping units in a linear arrangement, which has cost and manufacturing challenges. Significant cost savings and replacement ease can be achieved using modular barrel units which can be used across a number of fuel pump types, as well as by using lightweight; non-load-bearing housing. Furthermore, a space-saving fuel pump may be more easily used across engine sizes and types.

SUMMARY OF THE DISCLOSURE

The present disclosure provides a high-pressure fuel pump having barrel sets comprising offset, opposing barrel units within the same plane and having plungers disposed therein. The high-pressure fuel pump further includes a camshaft having at least one offset lobe and a cam ring encircling the lobe and in contact with the plungers, which translate the rotational movement of the camshaft to longitudinal movement of the plungers, controlling inflow, compression, and outflow of fuel within the pump.

In an exemplary embodiment of the present disclosure, a high-pressure pump is disclosed. The high-pressure pump comprises: a housing; a camshaft assembly disposed through the housing and having an offset lobe and a cam ring encircling the offset lobe; a first barrel unit disposed on a first side of the housing, the first barrel unit having a first axis; and a second barrel unit disposed on a second side of the housing opposite from the first side, wherein the first barrel unit and the second barrel unit are positioned within a first common plane. The second barrel unit has a second axis offset from the first axis.

The high-pressure pump may further comprise a first plunger disposed within the first barrel unit corresponding with the first axis and a second plunger disposed within the second barrel unit corresponding with the second axis, the first plunger and the second plunger in contact with the cam ring of the camshaft assembly. The high-pressure pump may further comprise a first spring positioned around the first plunger configured to bias the first plunger toward the camshaft assembly and a second spring positioned around the second plunger configured to bias the second plunger toward the camshaft assembly.

The high-pressure pump may further comprise a third barrel unit disposed on a third side of the housing, the third barrel unit having a third axis, and a fourth barrel unit disposed on a fourth side of the housing opposite from the third side, the fourth barrel unit having a fourth axis, wherein the third barrel unit and the fourth barrel unit are positioned within a second common plane and the third axis is offset form the fourth axis. The first barrel unit, the second barrel unit, the third barrel unit, and the fourth barrel unit may be equally disposed around a perimeter of the housing.

In another exemplary embodiment of the present disclosure, a high-pressure pump is disclosed. The high-pressure pump comprises: a housing; a camshaft assembly disposed through the housing, the camshaft having a centerline point, an offset lobe, and a cam ring encircling the offset lobe; a first barrel unit disposed on a first side of the housing, the first barrel unit having a first axis; and a second barrel unit disposed on a second side of the housing opposite from the first side, the second barrel unit having a second axis, the first axis and the second axis offset form the centerline point of the camshaft assembly.

The first axis and the second axis may be offset from each other. The first barrel unit and the second barrel unit may be modular barrel units, and the pump may further comprise any one of a passive inlet metering valve, an active inlet metering valve, and a hybrid active inlet metering valve.

The high-pressure pump may further comprise a third barrel unit disposed on a third side of the housing, the third barrel unit having a third axis; and a fourth barrel unit disposed on a fourth side of the housing opposite from the third side, the fourth barrel unit having a fourth axis. The third axis and the fourth axis may be offset from the centerline point of the camshaft assembly. The first barrel unit and the second barrel unit may be in a first common plane and the third barrel unit and the second barrel unit may be in a second common plane.

In yet another exemplary embodiment of the present disclosure, a high-pressure pump is disclosed. The high-pressure pump comprises: a housing, a camshaft assembly disposed through the housing, the camshaft assembly having an offset lobe and a cam ring encircling the offset lobe; a first modular barrel unit coupled to a first side of the housing; and any one of a passive inlet metering valve, an active inlet metering valve, and a hybrid active inlet metering valve.

The high-pressure pump may further comprise a second modular barrel unit coupled to the housing on a second side of the housing opposite from the first side, wherein the first modular barrel unit and the second modular barrel unit are positioned within a first common plane. The high-pressure pump may further comprise a third modular barrel unit coupled to the housing on a third side of the housing and a fourth modular barrel unit coupled to the housing on a fourth side of the housing opposite from the third side, the third modular barrel unit and the second modular barrel unit positioned within a second common plane.

The high-pressure pump may further comprise a plunger disposed within the modular barrel unit and in contact with the camshaft, wherein the plunger contacts the cam ring of the camshaft assembly at a point offset from a centerline point of the camshaft.

In yet another exemplary embodiment of the present disclosure, a modular barrel unit is disclosed. The modular barrel unit comprises a module body defining: a first opening configured to receive an inlet valve of at least one of a passive inlet metering valve, an active inlet metering valve, and a hybrid active inlet metering valve; a second opening configured to receive a plunger; a channel configured to house an outlet check valve; and a modular pathway configured to align with at least one fuel pathway of a high-pressure fuel pump. The modular barrel unit further comprises a plunger disposed within the second opening and an outlet check valve disposed within the channel.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The detailed description of the drawings particularly refers to the accompanying figures in which.

Figure 1A:
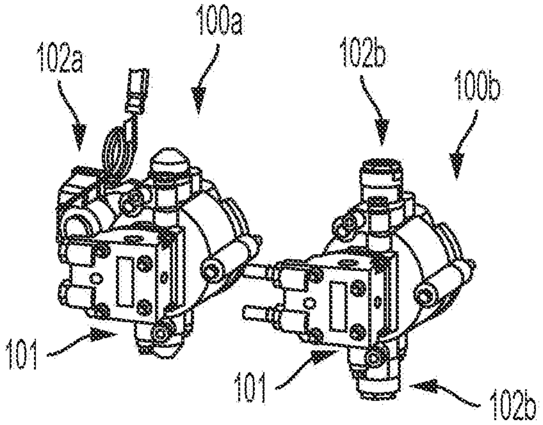
FIG. 1A is a perspective view of a high-pressure opposed unit pump having a passive inlet metering valve compared to a high-pressure opposed unit pump having an active inlet metering, valve.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

Figure 1B:
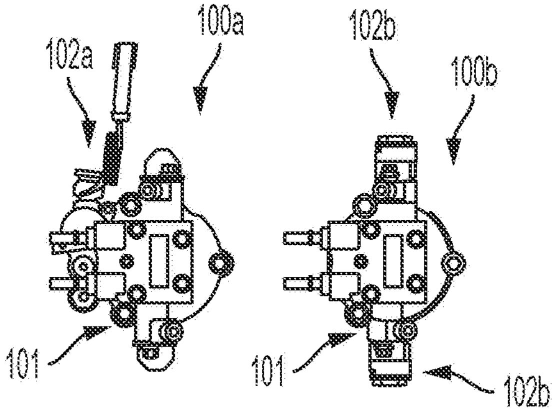
FIG. 1B is a front side view comparing the high-pressure opposed unit pump having a passive inlet metering valve of FIG. 1A with the high-pressure opposed unit pump having an active inlet metering valve of FIG. 1A.
Figure 1C:
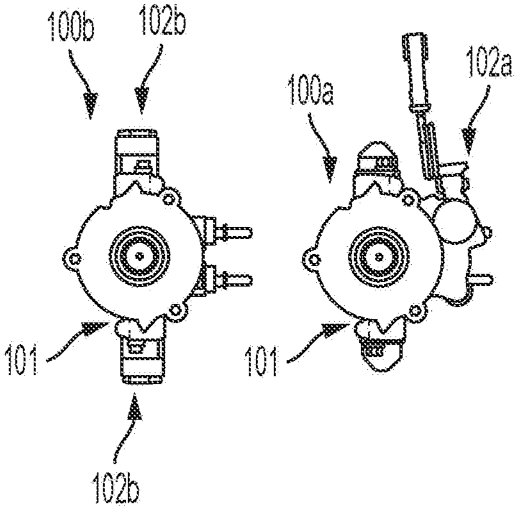
FIG. 1C is a back side view comparing the high-pressure opposed unit pump having a passive inlet metering valve of FIG. 1A with the high-pressure opposed unit pump having an active inlet metering valve of FIG. 1A.

Referring initially to FIGS. 1A-1C, high pressure pumps 100*a* and 100*b*, illustratively high-pressure fuel pumps for internal combustion engines, are disclosed. The high-pressure pump 100*a* is configured to include a passive inlet metering valve system 102*a*, while the high-pressure pump 100*b* is configured to include an active inlet metering system 102*b*. The remaining components of the high-pressure pumps 100*a* and 100*b* are consistent between the embodiments and will therefore be referred to with consistent reference numbers. Each of the high-pressure pumps 100 further include a modular barrel unit and camshaft arrangement 101 as discussed further herein.

Figure 2:
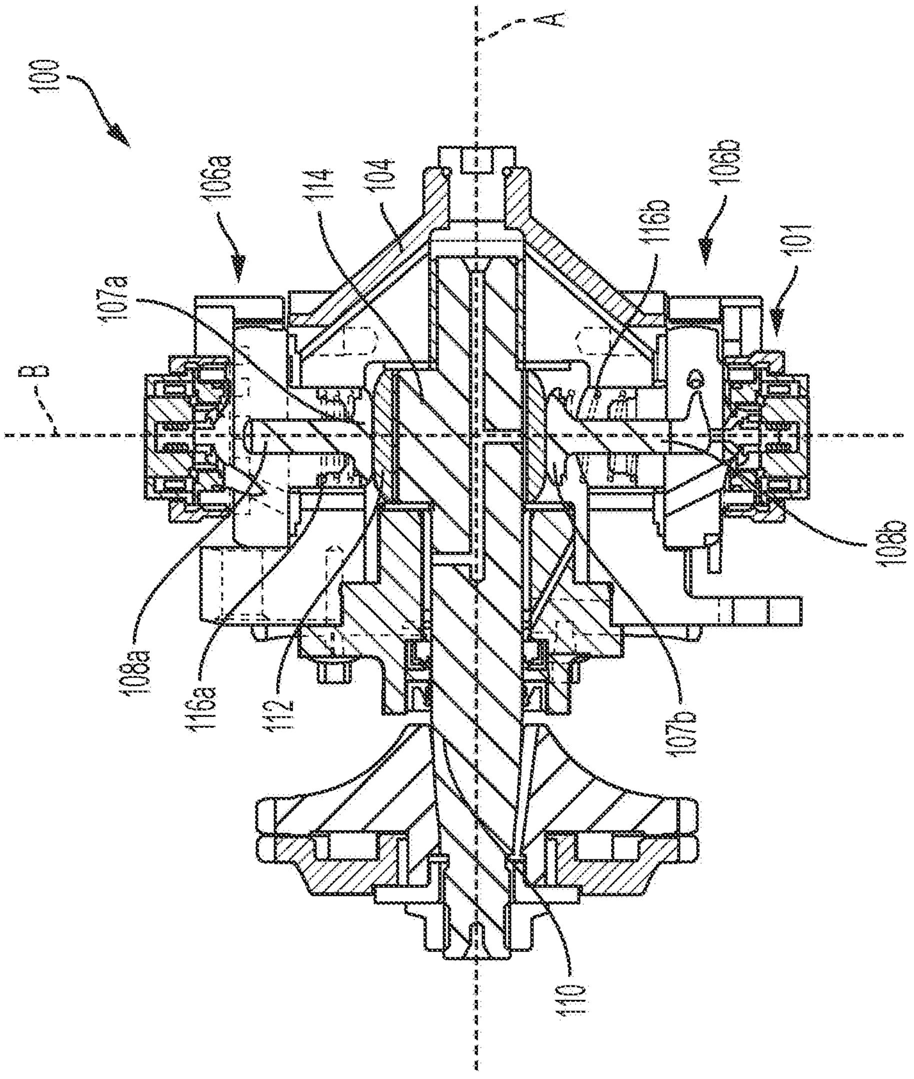
FIG. 2 is a cross-sectional, view of a high-pressure opposed unit pump, showing the interior make-up of the pump and the barrel units of the pump.

For example, referring to FIG. 2, a cross-section of the high-pressure pump 100 discloses the components of the modular barrel and camshaft arrangement 101, including a housing 104 and at least a first modular barrel unit 106*a* and a second modular barrel unit 106*b* positioned opposite of the housing from the first modular barrel unit 106*a*. In an illustrative embodiment, the housing 104 is comprised of a lightweight material, such as aluminum. In other embodiments, the housing 104 may be comprised of other materials, including polymers, metallic composites, and other metals. Each of the modular barrel units 106 include a plunger 108*a* and 108*b* disposed within the respective barrel 106*a* or 106*b*.

A camshaft assembly 110 is disposed through the housing 104 and is configured to rotate about an axis A; the camshaft includes at least one offset lobe 114 discussed further herein and a cam ring 112 encircling the at least one offset lobe 114. The cam ring 112 contacts a foot 107 of each of the plungers 108 either directly or indirectly via a shim or puck. A spring 116*a* or 116*b* may be included within the respective barrel 106 and disposed around the respective plunger 108 to bias the plungers 108 toward the camshaft assembly 110. As the camshaft assembly 110 rotates, the feet 107 of the respective plungers 108 follow the movement of the cam ring 112 and the lobe 114 to transfer the rotational movement of the camshaft to longitudinally movement of the plungers 108 within their respective barrels 106 along axis B, which may be positioned generally perpendicular to axis A. In other words, the axis B corresponds with both the barrel 106 and its respective plunger 108. Typically, center axes of the barrels discussed herein correspond with the center axes of the corresponding plungers.

The fuel is metered via active or passive inlet metering valves to control the inlet flow of fuel from a source such as a low pressure pump (not shown). The movement of each of the plunger 108 within each respective barrel 106 is translated to compression of the fuel within the pump 100 and outflow of the compressed fuel to the remainder of the fuel system of the engine (not shown). In an ideal embodiment discussed further herein, each barrel 106 has a unique axis offset from a unique axis of another barrel 106, each of the axes positioned generally perpendicular to axis A. In other words, as the plungers 108 follow the movement of the camshaft assembly 110, the bias from the springs 116 may be overcome to allow the plungers 108 to move within their respective barrels 106. As the plunger 108 moves in a direction generally away from the camshaft assembly 110, it interacts with the respective active or passive inlet metering valve system 102 to control the pumping of fuel for engine operation.

Figure 3B:
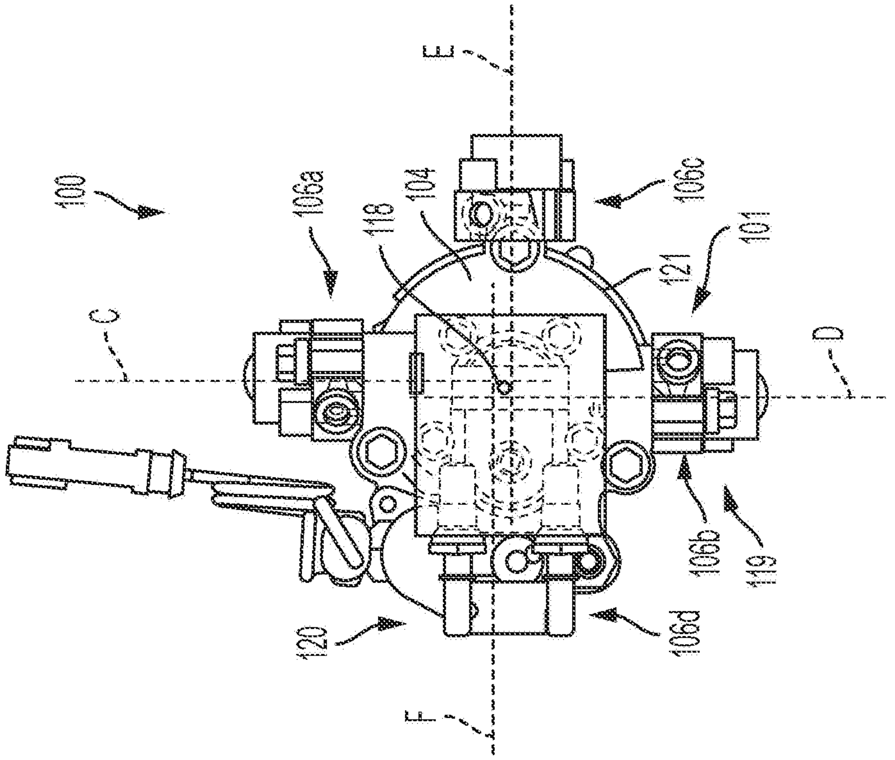
FIG. 3B is a front view of a high-pressure opposed unit pump, wherein the pump includes four modular barrel units.
Figure 3A:
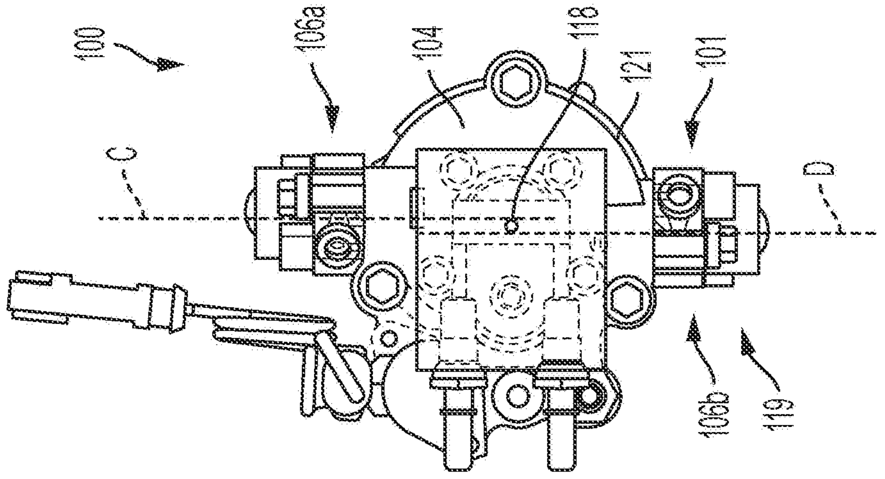
FIG. 3A is a front view of a high-pressure opposed unit pump, wherein the pump includes two modular barrel units.

Now referring to FIG. 3A an end view of the high-pressure pump 100 is shown, disclosing the offset axes C and D of barrels 106*a* and 106*b* of the modular barrel unit and camshaft arrangement 101 respectively. The axes C and D are not only offset from each other but are further offset from a centerline point of the camshaft assembly 110, the centerline point generally consistent with axis A (FIG. 2), as indicated by point 118. Ensuring that the barrels 106*a* and

106*b* are offset from the camshaft centerline point 118 reduces the plunger to barrel side load force magnitudes, thereby reducing scuffing power loss, plunger and barrel wear, and stress placed upon the foot 107 of the respective plunger 108 (FIG. 2) and further reduces stress on other components of the pump 100. FIG. 3B discloses an additional embodiment of the high pressure pump 100, wherein the pump 100 includes four barrels 106*a*, 106*b*, 106*c*, and 106*d*. Notably, each barrel 106 includes a unique offset axis, wherein axis C corresponds with barrel 106*a*, axis D corresponds with barrel 106*b*, axis E corresponds with barrel 106*c*, and axis F corresponds with barrel 106*d*. Each of the axes C, D, E, and F are offset from the camshaft centerline point 118 as described above in relation to FIG. 3A for the same advantages described above in relation to FIG. 3A.

Notably, the high-pressure pump 100 of FIG. 3B includes two sets of barrels 106. Barrel set 119 comprises barrels 106*a* and 106*b* and is positioned in a plane parallel to and including axes C and D. Barrel set 120 comprises barrels 106*c* and 106*d* and is positioned in a plane parallel to and including axes E and F. Further embodiments may comprise additional barrel sets, wherein each barrel set preferably includes two barrel units within a single plane to minimize torque loading on the camshaft assembly 110 (FIG. 2). Barrel units must be separated evenly around a perimeter 121 of the housing 104 of the pump 100 in a uniform manner to create a uniform load on the housing 104 and the camshaft assembly 110 (FIG. 2) but may otherwise be positioned in as many planes as feasible around the pump 100.

Figure 3C:
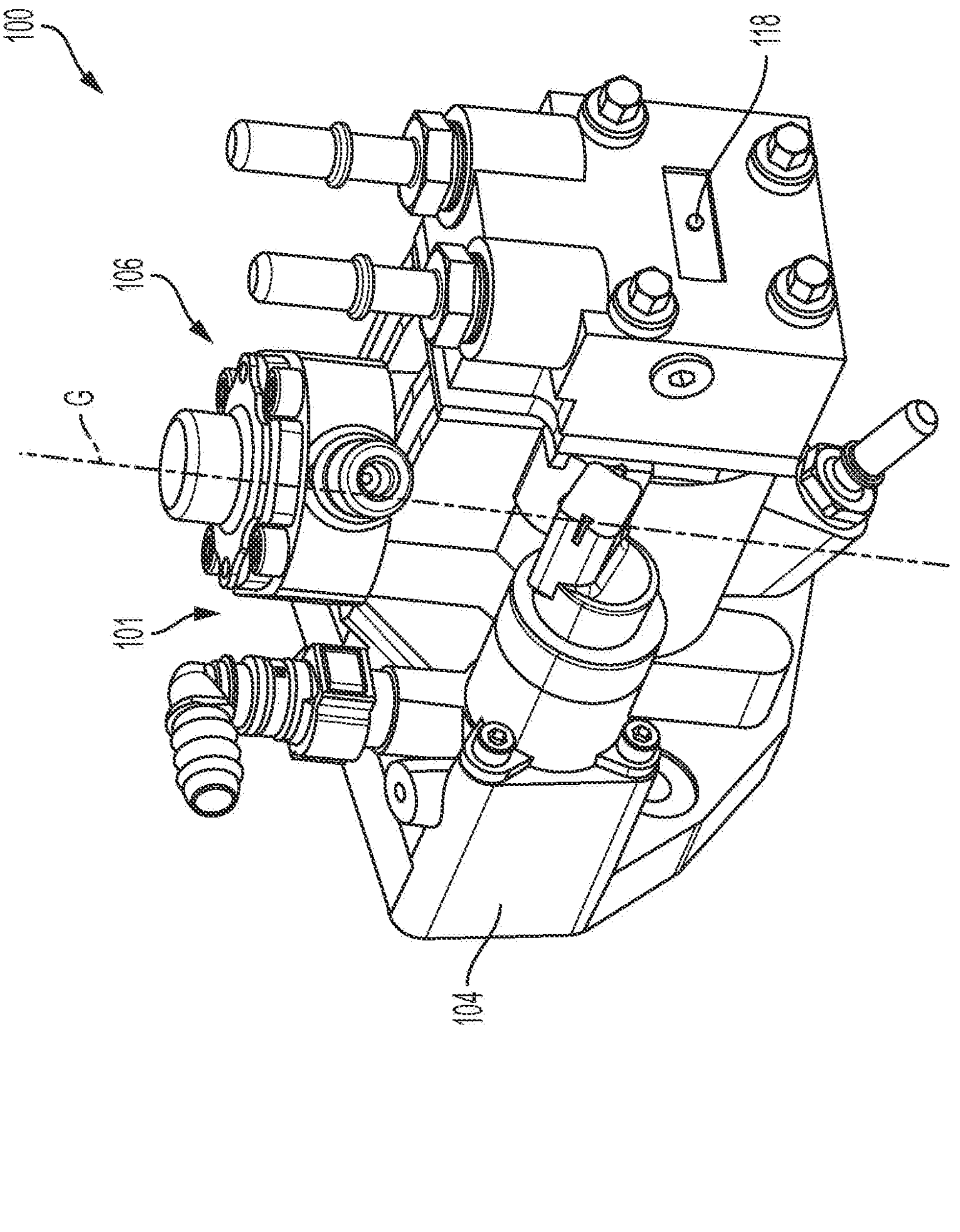
FIG. 3C is a perspective view of a high-pressure pump, wherein the pump includes one modular barrel unit.

Now referring to FIG. 3C, a high-pressure pump 100 may otherwise include only one barrel unit 106 to reduce cost and size for lower power engines. All of the components for single barrel pump 100 are the same as for the two barrel pump 100 of FIG. 3B, without the two barrel arrangement. The single barrel pump 100 reduces cost and is also provides for a smaller overall package to fit within smaller locations on smaller engines. The single barrel pump 100 operates the same as the other pumps described herein, wherein the barrel 106 is offset from a centerline 118 of the camshaft assembly 110 (FIG. 2) along axis G.

Figure 4B:
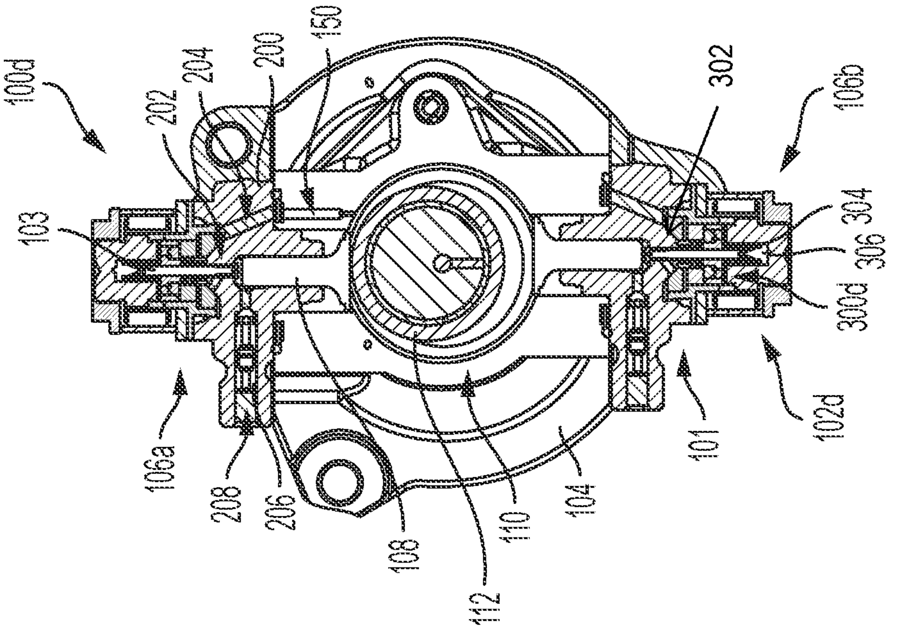
FIG. 4B is a cross-sectional view of a high-pressure opposed unit pump having a hybrid active inlet metering valve.
Figure 4A:
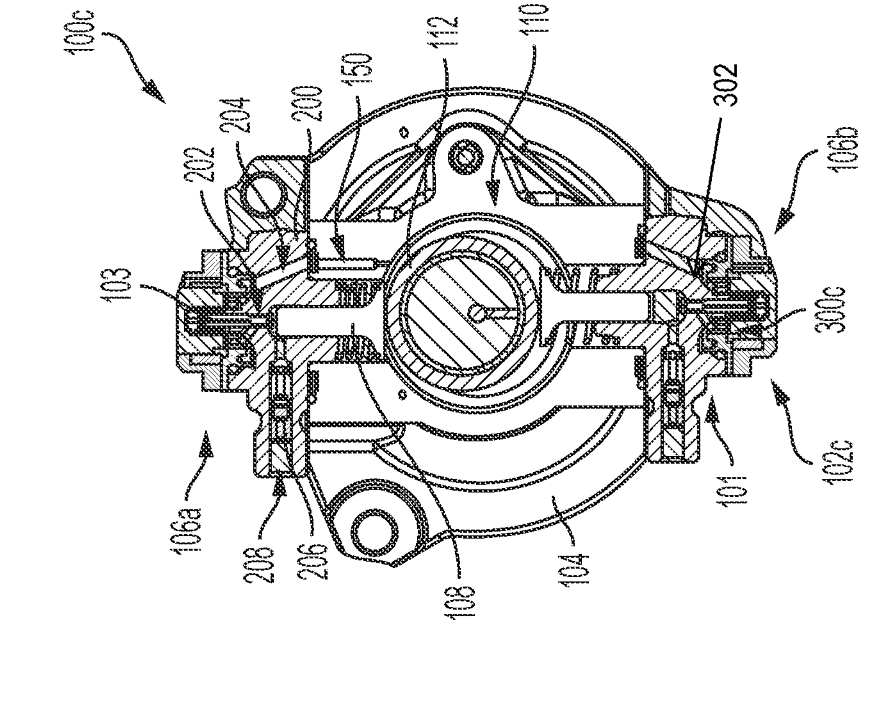
FIG. 4A is a cross-sectional view of a high-pressure opposed unit pump having an active inlet metering valve.

The ability of the modular barrel unit and camshaft arrangement 101 to be utilized among various types of pumps 100 is mentioned above in relation to FIGS. 1A-1C. Such modularity is further illustrated in FIGS. 4A-4C. FIG. 4A provides the cross-section of a high-pressure pump 100*c* having an active inlet metering valve 102*c*. FIG. 4B provides the cross-section of a high-pressure pump 100*d* having a hybrid active inlet metering valve 102*d*. The high-pressure pump 100*d* having the hybrid active inlet metering valve 102*d* achieves the same function as the active inlet metering valve 102*c*, however the hybrid active inlet metering valve 102*d* is capable of using existing components.

For example, the active inlet metering valve 102*c* includes an armature 300*c* that is disposed directly on a barrel post 302 of the modular barrel unit 106. However, for the hybrid active inlet metering valve 102*d*, the armature 300*d*, spring 304, spring retainer 306 and other components of the valve 102*d* are reused, which results in a taller overall structure for the high-pressure pump 100*d* relative to the high-pressure pump 100*c* having the active inlet metering valve 102*c*, as can be seen by comparing FIG. 4A with FIG. 4B. Additionally, the hybrid active inlet metering valve pump 100*d* allows common barrel architecture between inlet metering valve and active inlet metering valve embodiments while maximizing reuse of existing active inlet metering valve components.

Figure 4C:
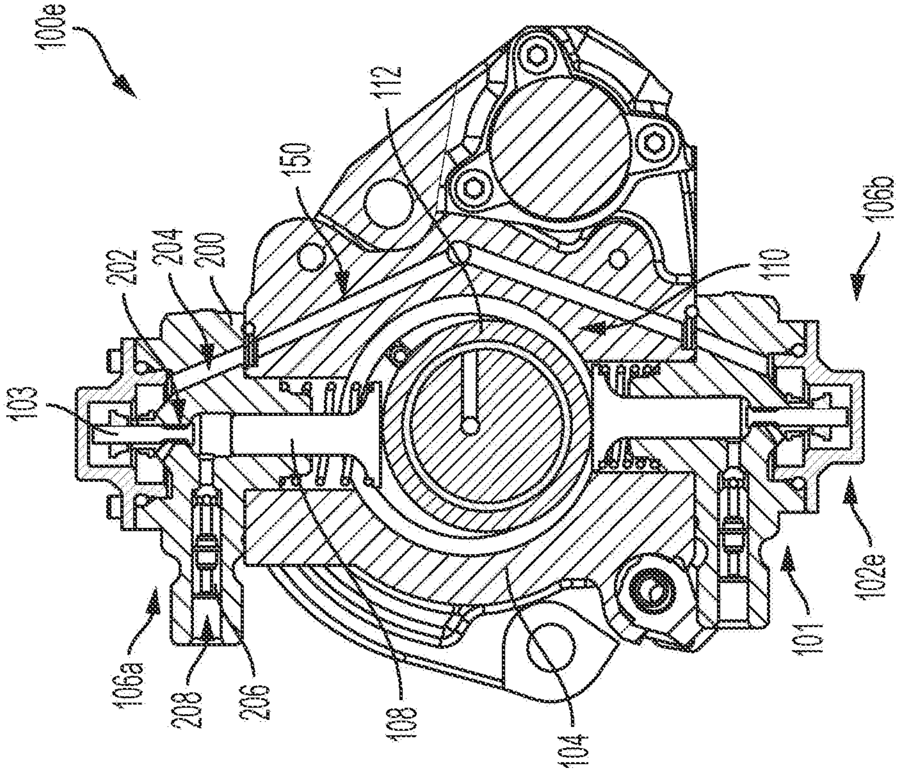
FIG. 4C is a cross-sectional view of a high-pressure opposed unit pump having a passive inlet metering valve.

FIG. 4C provides the cross-section of a high pressure pump 100*e* having a passive inlet metering valve 102*e*. As shown by the cross-section of each of the high pressure opposed pump, the modular barrel unit and camshaft, arrangement 101 is consistent across each of the high-pressure pumps 100. In other words, the modular barrel unit and camshaft arrangement 101 is capable of being applied across different types of high-pressure pumps to provide the benefits discussed above.

As illustrated in FIGS. 4A-4C, the modular barrel unit 106 includes a module body 200 with an opening 202 for the inlet valve 103 of the respective metering valve of the high-pressure pump 100. The plunger 108 is disposed at least partially within the module body 200 so that it operatively communicates with the cam ring 112 of the camshaft assembly 110 and the inlet valve 103. A pathway 204 is included through the module body 200 to align with fuel pathways 150 of the housing 104 of the high-pressure pump 100 for effective operation. The modular barrel unit 106 further includes an outlet check valve 206 disposed within a channel 208. The outlet check valve 206 allows the outflow of pressurized fluid during operation to be sent to a common rail of the engine or otherwise provided to the engine for operation without facilitating a leak from the high-pressure pump 100. Such modularity allows the modular barrel unit 106 itself to be replaced in the event of component failure rather than the entire high-pressure pump 100. The modularity of the modular barrel unit 106 further allows more convenient field service by providing a uniform unit across a number of types of high-pressure pumps and engines.

While the invention has been described by reference to various specific embodiments it should be understood that numerous changes may be made within the spirit and scope of the inventive concepts described, accordingly, it is intended that the invention not be limited to the described embodiments but will have full scope defined by the language of the following claims.

What is claimed is:

1. A high-pressure fuel pump comprising:

a housing including at least one fuel pathway with a plurality of openings at a housing surface of the housing;

a camshaft assembly disposed through the housing and having an offset lobe and a cam ring encircling the offset lobe;

a first barrel set including a first barrel unit and a second barrel unit positioned within a first common plane and disposed on opposite sides of the housing, the first barrel unit having a first center axis offset from a second center axis of the second barrel unit;

a second barrel set including a third barrel unit and a fourth barrel unit positioned within a second common plane and disposed on opposite sides of the housing, the third barrel unit having a third center axis offset from a fourth center axis of the fourth barrel unit, wherein each of the first barrel unit, the second barrel unit, the third barrel unit, and the fourth barrel unit are separated and evenly spaced apart around a perimeter of the housing of the high-pressure fuel pump to create a uniform load on the housing and the camshaft assembly, wherein each of the first barrel unit, the second barrel unit, the third barrel unit, and the fourth barrel unit includes a module body coupled to the housing, each module body including:

a barrel post having a first opening, and a hybrid active inlet metering valve mounted to the module body in the first opening, the hybrid active inlet metering valve including an armature mounted to the module body;

a second opening extending axially from the first opening and a plunger in the second opening so that the plunger is disposed at least partially in the module body and operatively communicates with the hybrid active inlet metering valve and the cam ring;

a channel and an outlet check valve housed in the channel; and a modular pathway from the first opening through the module body to a module body surface of the module body, the module body surface being mounted on the housing surface of the housing so that the modular pathway is aligned with one of the plurality of openings of the at least one fuel pathway of the housing.

2. The high-pressure fuel pump of claim 1, wherein the plunger is a first plunger disposed within the first barrel unit corresponding with the first center axis and further comprising a second plunger disposed within the second barrel unit corresponding with the second center axis, wherein the first plunger and the second plunger are in contact with the cam ring of the camshaft assembly.

3. The high-pressure fuel pump of claim 2, further comprising a first spring positioned around the first plunger, the first spring configured to bias the first plunger toward the camshaft assembly, and a second spring positioned around the second plunger, the second spring configured to bias the second plunger toward the camshaft assembly.

4. The high-pressure fuel pump of claim 1, further comprising a third plunger disposed within the third barrel unit corresponding with the third axis and a fourth plunger disposed within the fourth barrel unit corresponding with the fourth axis, wherein the third plunger and the fourth plunger are in contact with the cam ring of the camshaft assembly.

5. The high-pressure fuel pump of claim 4, further comprising a third spring positioned around the third plunger, the third spring configured to bias the third plunger toward the camshaft assembly, and a fourth spring positioned around the fourth plunger, the fourth spring configured to bias the fourth plunger toward the camshaft assembly.

6. The high-pressure fuel pump of claim 1, wherein for each module body the hybrid active inlet metering valve is mounted to the corresponding module body and includes a spring and a spring retainer.

7. The high-pressure fuel pump of claim 1, wherein:

the camshaft assembly includes a rotation axis; and each of the first center axis, the second center axis, the third center axis, and the fourth center axis are unique from one another and offset from the rotation axis.

8. A high-pressure fuel pump comprising:

a housing including at least one fuel pathway opening at a housing surface of the housing;

a camshaft assembly disposed through the housing, the camshaft assembly having a rotation axis, an offset lobe, and a cam ring encircling the offset lobe;

a first barrel set including a first barrel unit and a second barrel unit disposed on opposite sides of the housing, the first barrel unit having a first center axis offset from a second center axis of the second barrel unit;

a second barrel set including a third barrel unit and a fourth barrel unit disposed on opposite sides of the housing, the third barrel unit having a third center axis offset from a fourth center axis of the fourth barrel unit, wherein each of the first center axis, the second center axis, the third center axis, and the fourth center axis are offset from the rotation axis of the camshaft assembly and evenly spaced apart around a perimeter of the housing of the high-pressure fuel pump to create a uniform load on the housing and the camshaft assembly, wherein each the first barrel unit, the second barrel unit, the third barrel unit, and the fourth barrel unit includes a module body coupled to the housing, each module body including:

a barrel post having a first opening, and a hybrid active inlet metering valve or an active inlet metering valve mounted to the module body in the first opening, the hybrid active inlet metering valve or the active inlet metering valve including an armature mounted to the module body;

a second opening extending axially from the first opening and a plunger in the second opening so that the plunger is disposed at least partially in the module body and operatively communicates with the hybrid active inlet metering valve or the active inlet metering valve and the cam ring;

a channel and an outlet check valve housed in the channel; and a modular pathway from the first opening through the module body to a module body surface of the module body, the module body surface being mounted on the housing surface of the housing so that the modular pathway is aligned with one of the plurality of openings of the at least one fuel pathway of the housing.

9. The high-pressure fuel pump of claim 8, wherein the plunger is a first plunger disposed within the first barrel unit corresponding with the first center axis and further comprising a second plunger disposed within the second barrel unit corresponding with the second center axis.

10. The high-pressure fuel pump of claim 9, further comprising a third plunger disposed within the third barrel unit corresponding with the third axis and a fourth plunger disposed within the fourth barrel unit corresponding with the fourth axis, wherein the third plunger and the fourth plunger are in contact with the cam ring of the camshaft assembly.

11. The high-pressure fuel pump of claim 8, wherein the first barrel unit and the second barrel unit are in a first common plane and the third barrel unit and the fourth barrel unit are in a second common plane.

12. The high-pressure fuel pump of claim 8, wherein the first barrel unit and the second barrel unit are modular barrel units and the high-pressure fuel pump further comprises the hybrid active inlet metering valve or the active inlet metering valve and the outlet check valve being disposed on the first barrel unit and a second hybrid active inlet metering valve or the active inlet metering valve and a second outlet check valve being disposed on the second barrel unit.

13. The high-pressure fuel pump of claim 8, wherein each of the first center axis, the second center axis, the third center axis, and the fourth center axis are unique from one another and offset from the rotation axis.

14. A high-pressure fuel pump comprising:

a housing including at least one fuel pathway opening at a housing surface of the housing;

a camshaft assembly disposed through the housing, the camshaft assembly having an offset lobe and a cam ring encircling the offset lobe;

a first modular barrel unit coupled to a first side of the housing;

a second modular barrel unit coupled to the housing on a second side of the housing opposite from the first side, wherein the first modular barrel unit and the second modular barrel unit each include a module body coupled to the housing, each module body including:

a barrel post having a first opening;

a hybrid active inlet metering valve or an active inlet metering valve disposed in the first opening of the module body thereof and coupled to the housing through the corresponding first modular barrel unit and the second modular barrel unit, the hybrid active meting valve or the active inlet metering valve including an armature disposed on the module body;

a second opening extending axially from the first opening and a plunger in the second opening so that the plunger is disposed at least partially in the module body and operatively communicates with the cam ring and the hybrid active inlet metering valve or the active inlet metering valve disposed thereon;

a channel and an outlet check valve housed in the channel; and a modular pathway from the first opening through the module body to a module body surface of the module body, the module body surface being mounted on the housing surface of the housing so that the modular pathway is aligned with one of the plurality of openings of the at least one fuel pathway of the housing, wherein, in the event of failure of one or more components of the first modular barrel unit and the second modular barrel unit, removal of the first modular barrel unit and the second modular barrel unit from the housing also removes the corresponding hybrid active inlet metering valve or the active inlet metering valve disposed thereon so that the corresponding hybrid active metering valve or the active metering inlet valve is replaced by replacing the first modular barrel unit and/or the second modular barrel unit rather than replacing the entire high-pressure fuel pump.

15. The high-pressure fuel pump of claim 14, wherein the first modular barrel unit and the second modular barrel unit are positioned within a first common plane.

16. The high-pressure fuel pump of claim 15, further comprising a third modular barrel unit coupled to the housing on a third side of the housing and a fourth modular barrel unit coupled to the housing on a fourth side of the housing opposite from the third side, wherein the third modular barrel unit and the fourth modular barrel unit are positioned within a second common plane.

17. The high-pressure fuel pump of claim 14, wherein the plunger is disposed within the first modular barrel unit and in contact with the camshaft assembly, wherein the plunger contacts the cam ring of the camshaft assembly at a point offset from a rotation axis of the camshaft assembly.

18. The high-pressure fuel pump of claim 14, wherein for each module body the hybrid active inlet metering valve or the active inlet metering valve is disposed on the corresponding modular barrel unit, and both the outlet check valve and the hybrid active inlet metering valve or the active inlet metering valve are coupled to the housing via the corresponding modular barrel unit, and the hybrid active inlet metering valve or the active inlet metering valve includes a spring and a spring retainer mounted on the module body of the corresponding modular barrel unit.

19. A modular barrel unit comprising:

an inlet valve that is a hybrid active inlet metering valve, the hybrid active inlet metering valve including an armature; and a module body configured to be mounted at least partially within a housing of a high-pressure fuel pump, the module body including:

a barrel post including a first opening configured to receive the inlet valve so that the inlet valve is disposed on the module body;

a second opening extending axially from the first opening and configured to receive a plunger so that the plunger is disposed at least partially in the module body and operatively communicates with the inlet valve;

a channel configured to house an outlet check valve;

a modular pathway from the first opening through the module body to a module body surface that is mounted on a housing surface of the housing in alignment with an opening of at least one fuel pathway of the housing of the high-pressure fuel pump; and the armature disposed on the module body and further comprising a spring and a spring retainer mounted on the module body, wherein the armature, the spring, and the spring retainer are spaced apart from the barrel post, wherein, in the event of failure of one or more components of the modular barrel unit, the modular barrel unit including the hybrid active inlet metering valve disposed thereon is configured to be replaced rather than replacing the entire high-pressure fuel pump.

* * * * *